(12) United States Patent
Imada et al.

(10) Patent No.: US 9,108,865 B2
(45) Date of Patent: Aug. 18, 2015

(54) METHOD FOR TREATING BORON-CONTAINING WATER

(75) Inventors: Toshihiro Imada, Kawasaki (JP); Hideyuki Tsuji, Yokohama (JP); Arisa Yamada, Yokohama (JP); Shinetsu Fujieda, Kawasaki (JP); Tatsuoki Kohno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 422 days.

(21) Appl. No.: 13/411,787

(22) Filed: Mar. 5, 2012

(65) Prior Publication Data

US 2012/0234764 A1 Sep. 20, 2012

(30) Foreign Application Priority Data

Mar. 4, 2011 (JP) ................................. 2011-047980

(51) Int. Cl.
| | | |
|---|---|---|
| *C02F 1/42* | (2006.01) | |
| *B01D 15/04* | (2006.01) | |
| *C02F 1/66* | (2006.01) | |
| *C02F 1/04* | (2006.01) | |
| *C02F 1/28* | (2006.01) | |
| *C02F 1/44* | (2006.01) | |
| *C02F 1/469* | (2006.01) | |
| *C02F 101/10* | (2006.01) | |

(52) U.S. Cl.
CPC ................ *C02F 1/048* (2013.01); *C02F 1/288* (2013.01); *C02F 1/42* (2013.01); *C02F 1/66* (2013.01); *C02F 1/04* (2013.01); *C02F 1/44* (2013.01); *C02F 1/4693* (2013.01); *C02F 2101/108* (2013.01); *C02F 2209/06* (2013.01)

(58) Field of Classification Search
CPC ........ C02F 1/04; C02F 1/42; C02F 2101/108; C02F 2209/06; C02F 1/48; C02F 1/288; C02F 1/66; C02F 1/4693; C02F 1/44
USPC .................................. 210/664, 669, 683, 902
See application file for complete search history.

(56) References Cited

U.S. PATENT DOCUMENTS

| | | | | |
|---|---|---|---|---|
| 4,008,162 A | * | 2/1977 | Korenowski et al. | ......... 210/724 |
| 2009/0057231 A1 | * | 3/2009 | Schelhaas et al. | ............ 210/681 |

(Continued)

FOREIGN PATENT DOCUMENTS

| | | |
|---|---|---|
| JP | 57-081881 | 5/1982 |
| JP | 57-180493 | 11/1982 |
| JP | 2011-056394 | 3/2011 |

OTHER PUBLICATIONS

Mandy et al, Extraction of Boric Acid from Bittern Solutions of Quaron Lake, Egypt by Ion Exchange, 2004, pp. 297-300*

(Continued)

*Primary Examiner* — Matthew O Savage
(74) *Attorney, Agent, or Firm* — Oblon, McClelland, Maier & Neustadt, L.L.P.

(57) ABSTRACT

There is provided an efficient treatment method for boron-containing water capable of reducing an amount of use of medical agent and an amount of generation of sludge. A treatment method for boron-containing water of an embodiment includes a first process of concentrating boron-containing water to obtain boron-concentrated liquid. Further, the method includes a second process of making the boron-concentrated liquid to be brought into contact with a layered inorganic hydroxide, and making the layered inorganic hydroxide adsorb boron in the boron-concentrated liquid to remove boron.

17 Claims, 1 Drawing Sheet

(56) References Cited

U.S. PATENT DOCUMENTS

2011/0006010 A1* 1/2011 Asakura et al. ............... 210/670
2014/0039236 A1* 2/2014 Yamazaki et al. ............ 588/315

OTHER PUBLICATIONS

Ferreira et al, Evaluation of Boron Removal from Water by Hydrotalcite-Like Compounds, 2006, Chemosphere, vol. 62, pp. 80-88.*

* cited by examiner

METHOD FOR TREATING BORON-CONTAINING WATER

CROSS-REFERENCE TO RELATED APPLICATION

This application is based upon and claims the benefit of priority from the prior Japanese Patent Application No. 2011-047980, filed on Mar. 4, 2011; the entire contents of which are incorporated herein by reference.

FIELD

Embodiments described herein relate generally to a treatment method for boron-containing water.

BACKGROUND

Boric acid and borax are used for the application of glass, boron ferroalloy, chemical industry, glaze, and finishing agent, and from workplaces of the above, boron-containing waste water is discharged. Further, even in a workplace in which a boron compound is not used as a raw material, flue gas desulfurization waste water generated in a power station, smoke cleaning waste water in a garbage incineration plant, leaching waste water from a landfill and the like, for example, often contain the boron compound.

The boron compound is an essential trace element for animals and plants, but, there is a worry that an excessive consumption of the boron compound causes growth inhibition of plants and reproductive inhibition toxicity and impediment of nervous and digestive systems of animals. It has been clear that boron which is contained in a large amount in seawater or ground water is harmful to a living body such that an excessive consumption thereof causes growth inhibition, and there is provided an extremely strict regulation such that an effluent standard of Water Pollution Control Law for boron is 10 mg/L, and a water quality standard as drinking water for boron is domestically 1.0 mg/L or less, and is 0.5 mg/L or less in a WHO guideline.

However, the removal of boron from water is technically difficult, and the removal of boron from various types of boron-containing waste water such as waste water from a thermal power station containing high-concentration boron, and ground water and waste water generated in seawater desalination containing low-concentration boron, is still one of large technical tasks.

Generally, as a method of removing boron from boron-containing water, a coagulation sedimentation method in which boron is removed as an insoluble sediment by calcium hydroxide and aluminum sulfate, an adsorption resin method in which boron is adsorbed and removed by using a boron-adsorbing resin, a reverse osmosis membrane method, an evaporative concentration method, a solvent extraction method and the like are known.

However, in the method of removing boron as the insoluble sediment by adding the calcium compound such as calcium hydroxide and the aluminum compound such as aluminum sulfate, when high-concentration boron-containing water is set as a target, it is required to use a large amount of medical agents for sufficiently removing boron, resulting in that an amount of use of the medical agents and an amount of generation of sludge are both increased. Therefore, a cost of the medical agents is increased, and at the same time, it becomes difficult to perform sludge treatment.

In the boron-adsorbing resin method, in order to treat waste water containing high-concentration boron, a large amount of boron-adsorbing resin is required since an amount of adsorption of boron of the boron-adsorbing resin is small. Further, there is a problem that a frequency of regenerating the adsorbing resin is increased, resulting in that not only a cost of the resin itself but also a cost of medical agent for regeneration required for regeneration treatment is required.

In order to solve these problems, a method in which boron-containing water is treated by combining the coagulation sedimentation method using the aluminum compound and the calcium compound and the adsorption resin method using the boron-adsorbing resin, has been proposed. However, even with this method, there is a need to add a large amount of medical agents, resulting in that the amount of generation of sludge becomes large, and thus it is difficult to perform the sludge treatment.

Therefore, under the present circumstances, a development of boron treatment method capable of efficiently removing boron from boron-containing waste water and reducing an amount of generation of sludge at a time of performing boron treatment, is desired.

DETAILED DESCRIPTION

Figure 1:
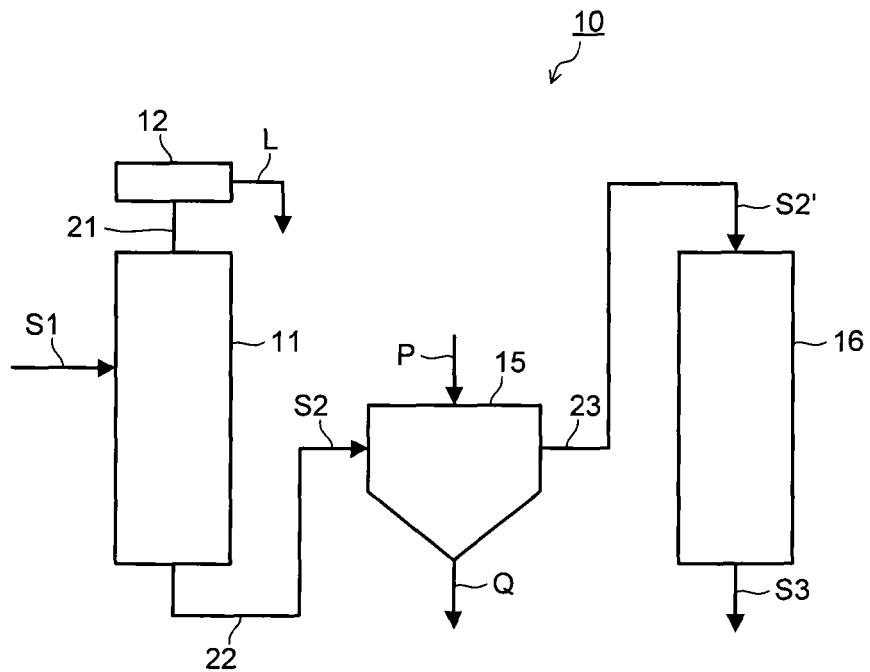
FIG. 1 is a diagram illustrating a schematic configuration of a treatment apparatus for boron-containing water in an embodiment.

The present embodiment provides an efficient treatment method for boron-containing water which enables to reduce an amount of use of medical agent and an amount of generation of sludge.

A treatment method for boron-containing water of an embodiment includes a first process of concentrating boron-containing water to obtain boron-concentrated liquid. Further, the method includes a second process of making the boron-concentrated liquid to be brought into contact with a layered inorganic hydroxide, and making the layered inorganic hydroxide adsorb boron in the boron-concentrated liquid to remove boron. Hereinafter, the embodiment of the present invention will be described in detail.

[Treatment Method for Boron-Containing Water]

<First Process>

In a treatment method for boron-containing water of the present embodiment, boron-containing water is first concentrated to obtain boron-concentrated liquid. Regarding boron in water, the higher the concentration of boron becomes, the more boron exists in a form of polymer ion such as $B_3O_3(OH)_4^-$, $B_5O_6(OH)_4^-$, and $B_3O_3(OH)_5^{2-}$. Therefore, in the boron-concentrated liquid, a large amount of boron exists in the form of polymer ion described above, so that, in particular, when the liquid is brought into contact with a layered inorganic hydroxide described below, it becomes possible to easily and efficiently remove boron based on a principle of adsorption and removal of the hydroxide.

Concretely, it is preferable to perform concentration so that a concentration of boron in the boron-concentrated liquid becomes 300 mg/L or more. This increases a ratio of the aforementioned polymer ion in the boron-concentrated liquid, so that it becomes possible to easily and efficiently perform removal of boron by the layered inorganic hydroxide described below.

Note that, although not particularly limited, an upper limit of the concentration of boron in the boron-concentrated liquid is preferably 5000 mg/L. Even if boron is concentrated to a value exceeding the value, the concentration of the polymer ion described above cannot be increased anymore, and further, an energy consumption associated with an operation of concentration increases, which is unfavorable in terms of energy saving as well.

Note that although not particularly limited, as the concentration method, there can be cited an evaporative concentration method, an electrodialysis method, a membrane separation method and the like, for example. In particular, the evaporative concentration method is suitable for concentrating the boron-containing water, since there is a small possibility that the method causes a scale trouble even with the use of water in which polymer ions exist.

Meanwhile, in the treatment method for boron-containing water of the present embodiment, when the boron-containing water has a fluoride ion concentration of several tens of mg/L or more, like waste water from a thermal power station and the like, it is preferable to provide a pre-coagulation separation process as a pretreatment process of the process of concentrating the boron-containing water. When the fluoride ion is contained in the boron-containing water, the fluoride ion concentration is increased by concentrating the boron-containing water, so that there is a possibility that a concentration apparatus or the like is corroded by the fluoride ion.

In the pre-coagulation separation process, a calcium ion is added to the boron-containing water containing the fluoride ion, and a pH adjusting agent is added to the water according to need. A generated insoluble sediment is subjected to solid-liquid separation, which enables to remove the fluoride ion. As a calcium ion source, calcium chloride, calcium hydroxide, aluminum sulfate, polyaluminum chloride and the like can be cited. As the pH adjusting agent, calcium hydroxide, sodium hydroxide, hydrochloric acid, sulfuric acid and the like can be used. Further, it is preferable that the pH adjusting agent is added so that a pH of the boron-containing water becomes 5 or more.

<Second Process>

In the treatment method for boron-containing water of the present embodiment, the boron-concentrated liquid is obtained as described above, the boron-concentrated liquid is then brought into contact with a layered inorganic hydroxide, and boron in the boron-concentrated liquid is removed by being adsorbed by the layered inorganic hydroxide.

The layered inorganic hydroxide in the present embodiment is only required to be an inorganic compound represented by a general formula $[Ma^{2+}_{(1-X)}Mb^{3+}_{(X)}(OH)_2][A^{n-}_{(X/n)} \cdot mH_2O]$ (n: 1 to 2, 1.6<m<2.3), and formed of a layer structure of a brucite layer $[Ma^{2+}_{(1-X)}Mb^{3+}_{(X)}(OH)_2]$ and an intermediate layer $[A^{n-}_{(X/n)} \cdot mH_2O]$ (A is an anion, X and Y indicate atomic ratios, and n is a valence of the anion) in water. Note that Ma is at least one kind of bivalent element selected from the group consisting of Ca, Mg, Zn, Mn, Co, Ni, and Fe, and Mb is at least one kind of trivalent element selected from the group consisting of Al, Fe, La, Ce, Cr, and Mn.

Further, in the layered inorganic hydroxide in the present embodiment, the ratio (atomic ratio) X between the bivalent element Ma and the trivalent element Mb preferably satisfies a relation of $0.2 \leq X \leq 0.33$. The structure is stabilized in the range of $0.2 \leq X \leq 0.33$, and accordingly, an amount of adsorption of boron is increased. In particular, the bivalent element Ma preferably includes at least Mg, and the trivalent element Mb preferably includes at least Al. In this case, the aforementioned layered inorganic hydroxide is represented by a general formula $[\{Mg_{1-Y}(\text{the other bivalent elements})_Y\}_{1-X}\{Al_{1-Z}(\text{the other trivalent elements})_Z\}_X]O_{1+X/2}$ ($0.25 \leq X \leq 0.33$, $0 < Y \leq 0.5$, $0 \leq z \leq 0.5$).

Further, the boron-adsorbing agent in the present embodiment may also be a composite oxide represented by a general formula $(Ma_{(1-X)}Mb_{(X)})O_{(1+X/2)}$ (Ma: bivalent element, Mb: trivalent element), and exhibiting a $MgAl_2O_4$ type spinel structure. The composite oxide becomes a layered inorganic hydroxide represented by a general formula $[Ma^{2+}_{(1-X)}Mb^{3+}_{(X)}(OH)_2][A^{n-}_{(X/n)} \cdot mH_2O]$ (n: 1 to 2, 1.6<m<2.3) (A is an anion, and X and Y indicate atomic ratios), under the presence of water. When the composite oxide is immersed in water, it turns into the aforementioned layered inorganic hydroxide, and it becomes possible to perform the adsorption of boron.

In the aforementioned composite oxide, the bivalent element Ma is at least one kind selected from the group consisting of Ca, Mg and Zn, and the trivalent element Mb is at least one kind selected from the group consisting of Al, Fe, La and Ce. If Ma and Mb are elements other than the above, the aforementioned composite oxide does not take the spinel structure, and further, when the composite oxide is immersed in water, it does not become a layered inorganic hydroxide with a hydrotalcite structure. As a result of this, adsorptivity of boron cannot be exhibited.

Note that the bivalent element Ma preferably includes at least Mg, and the trivalent element Mb preferably includes at least Al. Accordingly, the aforementioned function and effect are enhanced, resulting in that it becomes possible to obtain higher adsorptivity of boron. Specifically, a ratio of the spinel structure in the composite oxide is increased, resulting in that a stable layer structure in the layered inorganic hydroxide obtained when immersing the composite oxide in water can be obtained, and accordingly, it becomes possible to achieve high adsorptivity of boron.

Further, in the layered inorganic hydroxide in the present embodiment, a ratio X between the bivalent element Ma and the trivalent element Mb preferably satisfies a relation of $0.25 \leq X \leq 0.33$. The structure is stabilized in the range of $0.25 \leq X \leq 0.33$, and accordingly, an amount of adsorption of boron is increased.

Further, also in the aforementioned composite oxide, the bivalent element Ma preferably includes at least Mg, and the trivalent element Mb preferably includes at least Al. In this case, the aforementioned composite oxide is represented by a general formula $[\{Mg_{1-Y}(Ca,Zn)_Y\}_{1-X}\{Al_{1-Z}(Fe,La,Ce)_Z\}_X]O_{1+X/2}$ ($0.25 \leq X \leq 0.33$, $0 < Y \leq 0.5$, $0 \leq z \leq 0.5$).

Note that the aforementioned composite oxide can be produced in the following manner. Specifically, at first, $MaCl_2$ and $MbCl_3$ are set as raw materials, for example, these raw materials are weighed so that Ma and Mb satisfy the range of X in the aforementioned general formula, thereby adjusting an aqueous solution. Subsequently, the aqueous solution is dropped into an aqueous alkaline solution to obtain a sediment, and by performing solid-liquid separation, the sediment is taken out. The taken-out sediment corresponds to the layered inorganic hydroxide with the hydrotalcite structure such as one represented by the general formula $[Ma^{2+}_{(1-X)}Mb^{3+}_{(X)}(OH)_2][A^{n-}_{(X/n)} \cdot mH_2O]$ (n: 1 to 2, 1.6<m<2.3, $0.25 \leq X \leq 0.33$) (Ma: at least one kind of bivalent element, Mb: at least one kind of trivalent element) as described above.

Next, the layered inorganic hydroxide is subjected to heat treatment at a temperature of 200° C. or more and less than 500° C. Then, in the layered inorganic hydroxide represented by the general formula as described above, the layer structure is broken, and it is possible to obtain the composite oxide represented by the aforementioned general formula $(Ma_{(1-X)}Mb_{(X)})O_{(1+X/2)}$ (Ma: at least one kind of bivalent element selected from the group consisting of Ca, Mg and Zn, Mb: at least one kind of trivalent element selected from the group consisting of Al, Fe, La and Ce, $0.25 \leq X \leq 0.33$), and exhibiting the $MgAl_2O_4$ type spinel structure.

Note that a pH of the boron-concentrated liquid is preferably set to 6 or more. In this case, ionization of boron in the boron-concentrated liquid proceeds based on a reaction formula as described below, resulting in that an adsorptive activity of boron by the layered inorganic hydroxide described below is improved.

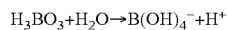

Further, by maintaining the pH of the boron-concentrated liquid to fall within a range of not less than 6 nor more than 12, the corrosion and scale trouble in the apparatus can be prevented. Note that a more preferable pH range is not less than pH 8 nor more than pH 12. In this range, removal efficiency of boron using the layered inorganic hydroxide is particularly enhanced. It is conceivable that the reason why the removal performance of boron is enhanced is because the ionization of boron proceeds based on the aforementioned reaction formula, and in addition to that, an amount of constituent of the layered inorganic hydroxide which is free in water is small and thus the hydroxide exists in a stable manner.

When the pH of the boron-concentrated liquid is less than 6, the pH adjusting agent is appropriately added to set the pH of the boron-concentrated liquid to be 6 or more. Concretely, it is possible to use sodium hydroxide or calcium hydroxide. On the other hand, when the boron-concentrated liquid is one of strong alkali with pH exceeding 12, it is possible to set the pH to fall within the aforementioned pH range by using hydrochloric acid, sulfuric acid or the like. Note that when the pH value of the boron-concentrated liquid is originally within the aforementioned pH range, there is no need to add the above-described pH adjusting agent.

Note that the pH adjustment of the boron-concentrated liquid may be directly performed on the boron-concentrated liquid after the boron-concentrated liquid is generated, or may also be previously performed on the boron-containing water before obtaining the boron-concentrated liquid.

Next, explanation will be made on the adsorption of boron when the layered inorganic hydroxide of the present embodiment is used. In water, the brucite layer $[Ma^{2+}_{(1-X)}Mb^{3+}_{(X)}(OH)_2]$ in the inorganic compound with layer structure represented by the general formula $[Ma^{2+}_{(1-X)}Mb^{3+}_{(X)}(OH)_2]$ $[A^{n-}_{(X/n)} \cdot mH_2O]$ (n: 1 to 2, $1.6 < m < 2.3$) is positively charged by replacing a part of the bivalent metal ion $Ma^{2+}$ with the trivalent metal ion $Mb^{3+}$, so that the intermediate layer $[A^{n-}_{(X/n)} \cdot mH_2O]$ (A is the anion) has a negative charge, resulting in that electroneutrality is maintained as a whole. In the intermediate layer having the negative charge, exchange of anion can be performed, so that the layered inorganic hydroxide has a function as an ion exchanger.

As described above, boron exists in the form of polymer ion such as $B_3O_3(OH)_4^-$, $B_5O_6(OH)_4^-$, and $B_3O_3(OH)_5^{2-}$ in the boron-concentrated liquid in the first process, and further, it exists in a form of ion of $B(OH)_4^-$ in the aforementioned pH adjustment. Therefore, such anion performs ion exchange with the intermediate layer of the above-described layered inorganic hydroxide, resulting in that boron in the boron-containing water becomes adsorbed in the aforementioned layered inorganic hydroxide.

As described above, in the present embodiment, the layered inorganic hydroxide that functions as the ion exchanger is used, and boron in the boron-containing water is adsorbed and removed through the ion exchange of the layered inorganic hydroxide, so that the removal performance of boron is extremely high. Therefore, for example, when compared to a conventional coagulation sedimentation method in which calcium hydroxide and aluminum sulfate are used to remove boron as an insoluble sediment, also in a case of removing a large amount of boron, in particular, there is no need to use a large amount of these medical agents, resulting in that an amount of sludge to be generated also becomes small.

Note that the sludge in the present embodiment corresponds to the layered inorganic hydroxide after adsorbing and removing the aforementioned ions, and since the layered inorganic hydroxide has a quite high removal performance of boron as described above, an amount of sludge to be generated becomes quite small, compared to the aforementioned conventional technique.

The adsorption and removal of boron using the layered inorganic hydroxide described above are conducted by making the aforementioned layered inorganic hydroxide to be brought into contact with the boron-concentrated liquid. As a concrete method of making the layered inorganic hydroxide to be brought into contact with the boron-concentrated liquid, for example, there can be cited a method in which a powder or a granulated powder using a binder of the layered inorganic hydroxide is put in the boron-concentrated liquid, thereby causing sedimentation. This method is an effective method when treating a relatively large amount of waste water. According to this method, although there is a worry that a water purification facility becomes relatively large in size, there is an advantage that a large amount of waste water can be treated at a time.

Further, it becomes possible to recover boron ions, namely, boron also by making a film support the aforementioned layered inorganic hydroxide and making this film to be immersed in the boron-concentrated liquid. Further, it is also possible to recover boron ions, namely, boron by filling the powder, the granulated powder or the like of the layered inorganic hydroxide in a column, and making the powder to be brought into contact with the boron-concentrated liquid by introducing the boron-concentrated liquid into the column. According to these methods, although the treatment apparatus becomes relatively small in size, an amount of treatment of waste water is limited, so that these methods are suitable for treating a small amount of waste water.

<Third Process>

In the present embodiment, residual liquid of the boron-concentrated liquid after removing boron using the layered inorganic hydroxide is brought into contact with a boron-adsorbing resin, which enables to adsorb and remove boron in the residual liquid.

In this case, the polymer ions such as $B_3O_3(OH)_4^-$, $B_5O_6(OH)_4^-$, and $B_3O_3(OH)_5^{2-}$ in the boron-concentrated liquid which could not be adsorbed and removed by the aforementioned layered inorganic hydroxide, the ion of $B(OH)_4^-$ and the like can be adsorbed and removed by the above-described boron-adsorbing resin, so that it becomes possible to remove boron from the boron-concentrated liquid, namely, the boron-containing water more perfectly.

The boron-adsorbing resin is a resin having an ability of selectively adsorbing boron in water. The boron-adsorbing resin to be used is not particularly limited, and it is possible to use a commercially available boron-adsorbing resin. For example, the use of N-glucamine type resin is suitable.

In the present embodiment, since the boron-containing water is concentrated in the first process, it is possible to drastically reduce the amount of water with which the boron-adsorbing resin is brought into contact. As a result of this, it is possible to reduce the amount of boron-adsorbing resin to be used, and to reduce the frequency of regenerating the resin.

Further, the boron-adsorbing resin whose amount of adsorption of boron is saturated, can be regenerated to be repeatedly used. A method of regeneration of the boron-adsorbing resin is not particularly limited, and it is possible to make boron to be eluted from the resin by using sulfuric acid, and then to regenerate the resin to the original N-glucamine type resin by using sodium hydroxide.

Note that the treated liquid after being subjected to the third process can be treated in a cyclic manner by making the liquid return to the first process or the second process.

The third process is not an essential process in the present embodiment, so that it can be omitted according to need.

[Treatment Apparatus for Boron-Containing Water]

FIG. 1 is a diagram illustrating a schematic configuration of a treatment apparatus for boron-containing water in the present embodiment. In the treatment apparatus for boron-containing water illustrated in FIG. 1, an evaporative concentration column 11, a first adsorptive removal tank 15 and a second adsorptive removal tank 16 are sequentially arranged from an upstream side toward a downstream side, via pipes 22 and 23, respectively. Note that in the first adsorptive removal tank 15, the powder or the granulated powder using the binder of the layered inorganic hydroxide described above is filled. Further, in the second adsorptive removal tank 16, the boron-adsorbing resin such as the N-glucamine type resin is filled. Further, a condenser 12 is provided above the evaporative concentration column 11 via a pipe 21.

The evaporative concentration column 11 is a concentration unit of obtaining the boron-concentrated liquid by concentrating the boron-containing water, as will be described below, and the first adsorptive removal tank 15 is an adsorptive removal unit of making boron in the boron-concentrated liquid to be brought into contact with the layered inorganic hydroxide to remove boron, as will be described below. Further, the second adsorptive removal tank 16 is an additional adsorptive removal unit of making boron in the residual liquid of the boron-concentrated liquid to be brought into contact with the boron-adsorbing resin to remove boron, as will be described later. Note that as is apparent from the above-described explanation, the second adsorptive removal tank 16 is not the essential component.

Next, a treatment method for boron-containing water using a treatment apparatus 10 for boron-containing water illustrated in FIG. 1 will be briefly described.

First, boron-containing water S1 is introduced into the evaporative concentration column 11, and the boron-containing water S1 is concentrated by the evaporative concentration method, thereby obtaining boron-concentrated liquid S2. The boron-concentrated liquid S2 passes through the pipe 22 to be transferred to the first adsorptive removal tank 15, and by the layered inorganic hydroxide filled in the first adsorptive removal tank 15, boron in the boron-concentrated liquid S2 is adsorbed and removed through the ion exchange as described above. The layered inorganic hydroxide after adsorbing boron is discharged to the outside as a sludge Q from a lower part of the first adsorptive removal tank 15. Note that in the first adsorptive removal tank 15, a pH adjusting agent P is added according to need, so that a pH value of the boron-concentrated liquid can be set to 6 or more, for example.

Meanwhile, a steam generated in the evaporative concentration column 11 passes through the pipe 21 to be transferred to the condenser 12, and is discharged to the outside as condensate water L, which can be reused according to need.

Next, residual liquid S2' of the boron-concentrated liquid S2 after adsorbing and removing boron in the first adsorptive removal tank 15, passes through the pipe 23 to be transferred to the second adsorptive removal tank 16, in which boron in the residual liquid S2' is adsorbed and removed by the boron-adsorbing resin. After the adsorption and removal of boron from the residual liquid S2' by the boron-adsorbing resin, the residual liquid S2' is discharged to the outside as treated water S3 from a lower part of the second adsorptive removal tank 16. Note that it is also possible that the treated water S3 is returned to the evaporative concentration column 11 or the first adsorptive removal tank 15 according to need, and to repeatedly conduct the operation as described above again.

Figure 2:
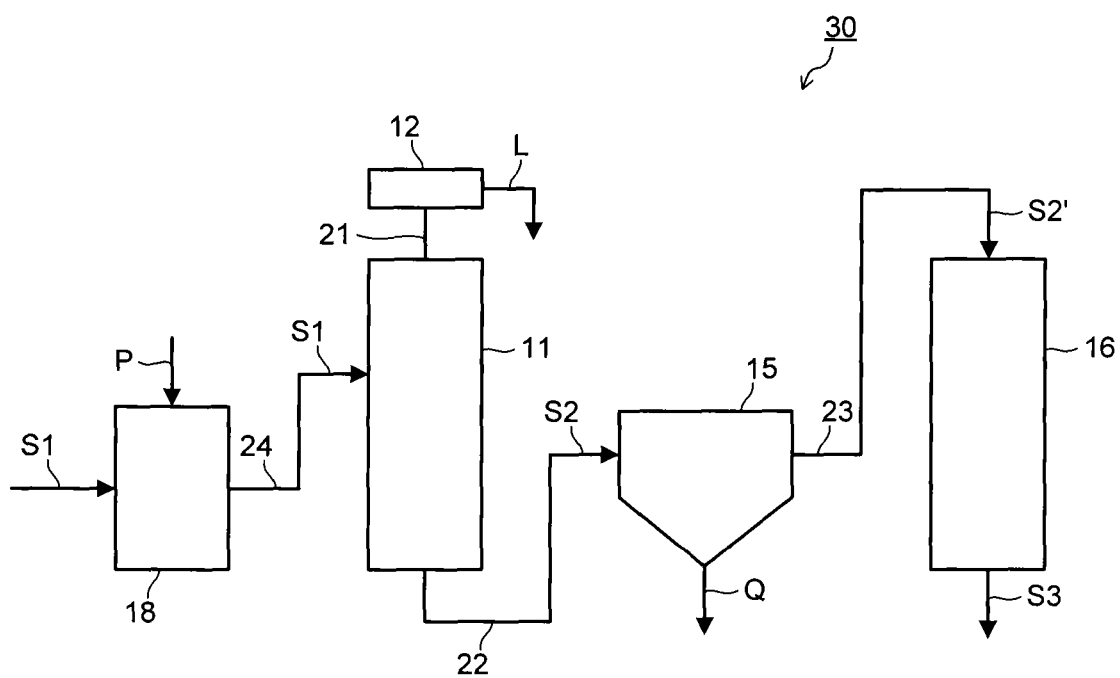
FIG. 2 is a diagram illustrating a schematic configuration illustrating a modified example of the treatment apparatus for boron-containing water illustrated in FIG. 1.

FIG. 2 is a diagram illustrating a modified example of the treatment apparatus for boron-containing water illustrated in FIG. 1. A treatment apparatus 30 for boron-containing water illustrated in FIG. 2 is different from the treatment apparatus 10 for boron-containing water illustrated in FIG. 1 in that a pH adjustment tank 18 is provided via a pipe 24 in a previous stage of the evaporative concentration column 11. Specifically, in the treatment apparatus 30 for boron-containing water illustrated in FIG. 2, the boron-containing water S1 is first introduced into the pH adjustment tank 18, and the pH adjusting agent P is added according to need, thereby setting a pH value of the boron-containing water to 6 or more, for example. Specifically, in the treatment apparatus illustrated in FIG. 2, the pH adjustment of the boron-concentrated liquid S2 is previously conducted at the stage of the boron-containing water, by providing the pH adjustment tank 18.

As described above, the pH adjustment of the boron-concentrated liquid S2 can be directly performed on the boron-concentrated liquid S2, or can be previously performed on the boron-containing water S1, so that in the treatment apparatus 30 illustrated in FIG. 2, a configuration of apparatus in which the pH adjustment of the boron-concentrated liquid S2 is previously performed on the boron-containing water 51 is illustrated.

The pH-adjusted boron-containing water S1 passes through the pipe 24 to be introduced into the evaporative concentration column 11, and after that, the treatment for boron-containing water is conducted in accordance with a treatment method associated with FIG. 1.

EXAMPLES

Example 1

Waste water containing 250 mg/L of boron was 4 times evaporated and concentrated, thereby obtaining concentrated water containing 1000 mg/L of boron. A layered inorganic hydroxide represented by $Mg_2Al(OH)_6Cl \cdot 1.5H_2O$ was added in an amount of 50 g/L to the concentrated water, a pH was subsequently adjusted to 9 by using sodium hydroxide, and stirring was performed for 15 minutes. Thereafter, supernatant liquid was separated, and a boron concentration in the supernatant liquid was 108 mg/L. Therefore, it was proved that 89.2% of boron was removed by the layered inorganic compound. Note that an amount of sludge being the layered inorganic compound after removing boron was 65.9 g/L. Results are presented in Table 1.

Example 2

A removal operation of boron from boron-containing water was conducted in a similar manner to the example 1, except that an amount of layered inorganic hydroxide represented by $Mg_2Al(OH)_6Cl \cdot 1.5H_2O$ was set to 25 g/L. When supernatant liquid was separated, a boron concentration in the supernatant liquid was 188 mg/L. Therefore, it was proved that 81.2% of boron was removed by the layered inorganic compound. Note that an amount of sludge being the layered inorganic compound after removing boron was 36.2 g/L. Results are presented in Table 1.

Example 3

A removal operation of boron from boron-containing water was conducted in a similar manner to the example 1, except that a pH of concentrated water was set to 6 by using sodium hydroxide. When supernatant liquid was separated, a boron concentration in the supernatant liquid was 185 mg/L. Therefore, it was proved that 81.5% of boron was removed by the layered inorganic compound. Note that an amount of sludge being the layered inorganic compound after removing boron was 65.8 g/L. Results are presented in Table 1.

Example 4

A removal operation of boron from boron-containing water was conducted in a similar manner to the example 1, except that a pH of concentrated water was set to 12 by using sodium hydroxide. When supernatant liquid was separated, a boron concentration in the supernatant liquid was 136 mg/L. Therefore, it was proved that 86.4% of boron was removed by the layered inorganic compound. Note that an amount of sludge being the layered inorganic compound after removing boron was 65.9 g/L. Results are presented in Table 1.

Example 5

A removal operation of boron from boron-containing water was conducted in a similar manner to the example 1, except that waste water containing 250 mg/L of boron was 1.2 times evaporated and concentrated, thereby obtaining concentrated water containing 300 mg/L of boron. When supernatant liquid was separated, a boron concentration in the supernatant liquid was 59.1 mg/L. Therefore, it was proved that 80.3% of boron was removed by the layered inorganic compound. Note that an amount of sludge being the layered inorganic compound after removing boron was 65.8 g/L. Results are presented in Table 1.

Example 6

A removal operation of boron from boron-containing water was conducted in a similar manner to the example 5, except that an amount of layered inorganic hydroxide represented by $Mg_2Al(OH)_6Cl \cdot 1.5H_2O$ was set to 25 g/L. When supernatant liquid was separated, a boron concentration in the supernatant liquid was 74.1 mg/L. Therefore, it was proved that 75.7% of boron was removed by the layered inorganic compound. Note that an amount of sludge being the layered inorganic compound after removing boron was 36.1 g/L. Results are presented in Table 1.

Example 7

A removal operation of boron from boron-containing water was conducted in a similar manner to the example 1, except that a layered inorganic hydroxide represented by $Mg_2Fe(OH)_6Cl \cdot 1.5H_2O$ was used, instead of the layered inorganic hydroxide represented by $Mg_2Al(OH)_6Cl \cdot 1.5H_2O$. When supernatant liquid was separated, a boron concentration in the supernatant liquid was 143 mg/L. Therefore, it was proved that 85.7% of boron was removed by the layered inorganic compound. Note that an amount of sludge being the layered inorganic compound after removing boron was 65.8 g/L. Results are presented in Table 1.

Example 8

A removal operation of boron from boron-containing water was conducted in a similar manner to the example 1, except that a layered inorganic hydroxide represented by $Mg_2Ce(OH)_6Cl \cdot 1.5H_2O$ was used, instead of the layered inorganic hydroxide represented by $Mg_2Al(OH)_6Cl \cdot 1.5H_2O$. When supernatant liquid was separated, a boron concentration in the supernatant liquid was 175 mg/L. Therefore, it was proved that 82.5% of boron was removed by the layered inorganic compound. Note that an amount of sludge being the layered inorganic compound after removing boron was 65.8 g/L. Results are presented in Table 1.

Example 9

A removal operation of boron from boron-containing water was conducted in a similar manner to the example 1, except that a layered inorganic hydroxide represented by $Ca_2Al(OH)_6Cl \cdot 1.5H_2O$ was used, instead of the layered inorganic hydroxide represented by $Mg_2Al(OH)_6Cl \cdot 1.5H_2O$. When supernatant liquid was separated, a boron concentration in the supernatant liquid was 181 mg/L. Therefore, it was proved that 81.9% of boron was removed by the layered inorganic compound. Note that an amount of sludge being the layered inorganic compound after removing boron was 66.1 g/L. Results are presented in Table 1.

Example 10

A removal operation of boron from boron-containing water was conducted in a similar manner to the example 1, except that a layered inorganic hydroxide represented by $Ca_2Fe(OH)_6Cl \cdot 1.5H_2O$ was used, instead of the layered inorganic hydroxide represented by $Mg_2Al(OH)_6Cl \cdot 1.5H_2O$. When supernatant liquid was separated, a boron concentration in the supernatant liquid was 186 mg/L. Therefore, it was proved that 81.4% of boron was removed by the layered inorganic compound. Note that an amount of sludge being the layered inorganic compound after removing boron was 66.0 g/L. Results are presented in Table 1.

Example 11

A removal operation of boron from boron-containing water was conducted in a similar manner to the example 1, except that a layered inorganic hydroxide represented by $Mg_3Al(OH)_8Cl \cdot 2H_2O$ was used, instead of the layered inorganic hydroxide represented by $Mg_2Al(OH)_6Cl \cdot 1.5H_2O$. When supernatant liquid was separated, a boron concentration in the supernatant liquid was 112 mg/L. Therefore, it was proved that 87.8% of boron was removed by the layered inorganic compound. Note that an amount of sludge being the layered inorganic compound after removing boron was 65.9 g/L. Results are presented in Table 1.

Example 12

A removal operation of boron from boron-containing water was conducted in a similar manner to the example 1, except that a layered inorganic hydroxide represented by $Mg_4Al(OH)_{10}Cl \cdot 2.5H_2O$ was used, instead of the layered inorganic hydroxide represented by $Mg_2Al(OH)_6Cl \cdot 1.5H_2O$. When supernatant liquid was separated, a boron concentration in the supernatant liquid was 139 mg/L. Therefore, it was proved that 87.7% of boron was removed by the layered inorganic compound. Note that an amount of sludge being the layered inorganic compound after removing boron was 65.9 g/L. Results are presented in Table 1.

Example 13

A removal operation of boron from boron-containing water was conducted in a similar manner to the example 1, except that a layered inorganic hydroxide represented by $Mg_4Al(OH)_8(NO_3) \cdot 1.5H_2O$ was used, instead of the layered inorganic hydroxide represented by $Mg_2Al(OH)_6Cl \cdot 1.5H_2O$. When supernatant liquid was separated, a boron concentration in the supernatant liquid was 123 mg/L. Therefore, it was proved that 87.7% of boron was removed by the layered inorganic compound. Note that an amount of sludge being the layered inorganic compound after removing boron was 65.9 g/L. Results are presented in Table 1.

Example 14

A removal operation of boron from boron-containing water was conducted in a similar manner to the example 1, except that a layered inorganic hydroxide represented by $Mg_{44}Al_2(OH)_{12}(SO_4) \cdot 3H_2O$ was used, instead of the layered inorganic hydroxide represented by $Mg_2Al(OH)_6Cl \cdot 1.5H_2O$. When supernatant liquid was separated, a boron concentration in the supernatant liquid was 151 mg/L. Therefore, it was proved that 84.9% of boron was removed by the layered inorganic compound. Note that an amount of sludge being the layered inorganic compound after removing boron was 65.9 g/L. Results are presented in Table 1.

Comparative Example 1

A layered inorganic hydroxide represented by $Mg_2Al(OH)_6Cl \cdot 1.5H_2O$ was added in an amount of 50 g/L to waste water containing 250 mg/L of boron which was not concentrated, a pH was subsequently adjusted to 9 by using sodium hydroxide, and stirring was performed for 15 minutes. Thereafter, when supernatant liquid was separated, a boron concentration in the supernatant liquid was 87.3 mg/L. Therefore, it was proved that 65.1% of boron was removed by the layered inorganic compound. Note that an amount of sludge being the layered inorganic compound after removing boron was 65.9 g/L. Results are presented in Table 1.

Comparative Example 2

A removal operation of boron from boron-containing water was conducted in a similar manner to the comparative example 1, except that a layered inorganic hydroxide represented by $Mg_2Al(OH)_6Cl \cdot 1.5H_2O$ was added in an amount of 25 g/L. When supernatant liquid was separated, a boron concentration in the supernatant liquid was 104.3 mg/L. Therefore, it was proved that 58.3% of boron was removed by the layered inorganic compound. Note that an amount of sludge being the layered inorganic compound after removing boron was 36.3 g/L. Results are presented in Table 1.

Comparative Example 3

Waste water containing 250 mg/L of boron was 4 times evaporated and concentrated, thereby obtaining concentrated water containing 1000 mg/L of boron. Aluminum sulfate was added in an amount of 25 g/L and calcium hydroxide was added in an amount of 25 g/L to the concentrated water, and stirring was performed for 15 minutes. Thereafter, when supernatant liquid was separated, a boron concentration in the supernatant liquid was 322 mg/L. It was proved that 67.8% of boron was removed by coagulation sedimentation treatment. Further, an amount of sludge after removing boron was 135 g/L. Results are presented in Table 2.

Comparative Example 4

A removal operation of boron from boron-containing water was conducted in a similar manner to the comparative example 2, except that waste water containing 250 mg/L of boron was 1.2 times evaporated and concentrated, thereby obtaining concentrated water containing 300 mg/L of boron. When supernatant liquid was separated, a boron concentration in the supernatant liquid was 89.4 mg/L. Therefore, it was proved that 70.2% of boron was removed by the layered inorganic compound. Note that an amount of sludge being the layered inorganic compound after removing boron was 135 g/L. Results are presented in Table 2.

Comparative Example 5

A removal operation of boron from boron-containing water was conducted in a similar manner to the comparative example 1, except that aluminum sulfate in an amount of 25 g/L and calcium hydroxide in an amount of 25 g/L were used, instead of the layered inorganic hydroxide represented by $Mg_2Al(OH)_6Cl \cdot 1.5H_2O$. When supernatant liquid was separated, a boron concentration in the supernatant liquid was 79.3 mg/L. Therefore, it was proved that 68.3% of boron was removed by the layered inorganic compound. Note that an amount of sludge being the layered inorganic compound after removing boron was 135 g/L. Results are presented in Table 2.

Note that the above-described examples and comparative examples can be carried out by using the treatment apparatus 10 or 30 as illustrated in FIG. 1 or FIG. 2.

TABLE 1

|  | Boron Concentration In Concentrated Water (mg/L) | Concentration Rate | pH in Concentrated Water | Concentration of Added Layered Inorganic Hydroxide (g/L) | Boron Concentration in Supernatant Water (mg/L) | Boron Removal Ratio (%) | Ratio of Generated Sludge (g/L) |
|---|---|---|---|---|---|---|---|
| Example 1 | 1000 | 4 | 9 | 50 | 108 | 89.2 | 65.9 |
| Example 2 | 1000 | 4 | 9 | 25 | 188 | 81.2 | 36.2 |
| Example 3 | 1000 | 4 | 6 | 50 | 185 | 81.5 | 65.8 |
| Example 4 | 1000 | 4 | 12 | 50 | 136 | 86.4 | 65.9 |
| Example 5 | 300 | 1.2 | 9 | 50 | 59.1 | 80.3 | 65.8 |
| Example 6 | 300 | 1.2 | 9 | 25 | 74.1 | 75.7 | 36.1 |

TABLE 1-continued

|  | Boron Concentration In Concentrated Water (mg/L) | Concentration Rate | pH in Concentrated Water | Concentration of Added Layered Inorganic Hydroxide (g/L) | Boron Concentration in Supernatant Water (mg/L) | Boron Removal Ratio (%) | Ratio of Generated Sludge (g/L) |
|---|---|---|---|---|---|---|---|
| Example 7 | 1000 | 4 | 9 | 50 | 143 | 85.7 | 65.8 |
| Example 8 | 1000 | 4 | 9 | 50 | 175 | 82.5 | 65.8 |
| Example 9 | 1000 | 4 | 9 | 50 | 181 | 81.9 | 66.1 |
| Example 10 | 1000 | 4 | 9 | 50 | 186 | 81.4 | 66 |
| Example 11 | 1000 | 4 | 9 | 50 | 112 | 87.8 | 65.9 |
| Example 12 | 1000 | 4 | 9 | 50 | 139 | 86.1 | 65.9 |
| Example 13 | 1000 | 4 | 9 | 50 | 123 | 87.7 | 65.9 |
| Example 14 | 1000 | 4 | 9 | 50 | 151 | 84.9 | 65.8 |
| Comparative Example 1 | 250 | 1 | 9 | 50 | 87.3 | 65.1 | 65.9 |
| Comparative Example 2 | 250 | 4 | 9 | 25 | 104.3 | 58.3 | 36.3 |

TABLE 2

|  | Boron Concentration In Concentrated Water (mg/L) | Concentration Rate | pH in Concentrated Water | Concentration of Added Aluminum Sulfate and Calcium Hydroxide (g/L) | Boron Concentration in Supernatant Water (mg/L) | Boron Removal Ratio (%) | Ratio of Generated Sludge (g/L) |
|---|---|---|---|---|---|---|---|
| Comparative Example 3 | 1000 | 4 | 9 | 50 | 322 | 67.8 | 135 |
| Comparative Example 4 | 300 | 1.2 | 9 | 50 | 89.4 | 70.2 | 135 |
| Comparative Example 5 | 250 | 1 | 9 | 50 | 79.3 | 68.3 | 135 |

From the results in Table 1, it was proved that when the removal of boron was conducted by concentrating the boron-containing water and then making the water to be brought into contact with the layered inorganic hydroxide, a boron removal ratio was improved, compared to a case where the removal of boron was conducted by making the boron-containing water which was not concentrated to be brought into contact with the layered inorganic hydroxide.

Further, from the comparison of the examples 1, 3 and 4, it can be understood that when the amount of layered inorganic hydroxide was set to a constant amount, a boron removal ratio was improved in a state where the pH of the concentrated liquid was greater than 6, and was pH 9 or 12.

Furthermore, it can be understood that, as is apparent from Table 1 and Table 2, when aluminum sulfate and aluminum hydroxide were used instead of the layered inorganic hydroxide, the boron removal ratio was low, and the amount of generation of sludge increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for treating a treatment water containing boron, the method comprising:

(I) concentrating a treatment water containing boron as an ion, to obtain a boron-concentrated water solution containing at least one of $B_3O_3(OH)_4^-$, $B_5O_6(OH)_4^-$, and $B_3O_3(OH)_5^{2-}$;

(II) contacting the boron-concentrated water solution with a layered inorganic hydroxide to adsorb said at least one of $B_3O_3(OH)_4^-$; $B_5O_6(OH)_4^-$; and $B_3O_3(OH)_5^{2-}$ from the boron-concentrated water solution, the layered inorganic hydroxide having formula (1):

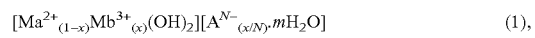

$$[Ma^{2+}_{(1-x)}Mb^{3+}_{(x)}(OH)_2][A^{N-}_{(x/N)}, mH_2O] \qquad (1),$$

wherein:
Ma is a bivalent element;
Mb is a trivalent element;
A is an anion;
n is a valence of the anion from 1 to 2;
X represents an atomic ratio; and
m is more than 1.6 and less than 2.3.

2. The method of claim 1, wherein the concentrating is performed by an evaporative concentration of the treatment water.

3. The method of claim 1, wherein the boron-concentrated water solution obtained in (I) has a boron concentration of 300 mg/L or more.

4. The method of claim 3, wherein the boron-concentrated water solution obtained in (I) has a boron concentration in a range from 300 mg/L to 5000 mg/L.

5. The method of claim 1, wherein a pH of the boron-concentrated liquid water solution is set to 6 or more.

6. The method of claim 5, further comprising:
adding a pH adjusting agent to the treatment water.

7. The method of claim 6, wherein the pH adjusting agent comprises sodium hydroxide.

8. The method of claim 6, wherein the pH adjusting agent comprises calcium hydroxide.

9. The method of claim 5, wherein a pH of the boron-concentrated water solution is set in a range of not less than 6 and not more than 12.

10. The method of claim 9, further comprising;
adding a pH adjusting agent to the treatment water.

11. The method of claim 10, wherein the pH adjusting agent comprises hydrochloric acid.

12. The method of claim 10, wherein the pH adjusting agent comprises sulfuric acid.

13. The method of claim 10, wherein the pH adjusting agent comprises sodium hydroxide.

14. The method of claim 10, wherein the pH adjusting agent comprises calcium hydroxide.

15. The method of claim 5, wherein a pH of the boron-concentrated water solution is set in a range of not less than 8 and not more than 12.

16. The method of claim 1, further comprising, after (II):
   (III) contacting the boron-concentrated water solution after the contacting, with a boron-adsorbing resin, to adsorb boron from the residual liquid.

17. The method of claim 1, wherein, in formula (1):
Ma is at least one of bivalent element selected from the group consisting of Ca, Mg, Zn, Mn, Co, Ni, and Fe; and
Mb is at least one of trivalent element selected from the group consisting of Al, Fe, La, Ce, Cr, and Mn.

\* \* \* \* \*